Sept. 6, 1927.  1,641,669
G. FAST
FLEXIBLE SHAFT COUPLING
Filed March 17, 1925  2 Sheets-Sheet 1

Inventor:
Gustave Fast,
by Spear, Middleton, Donaldson & Hall
Attys.

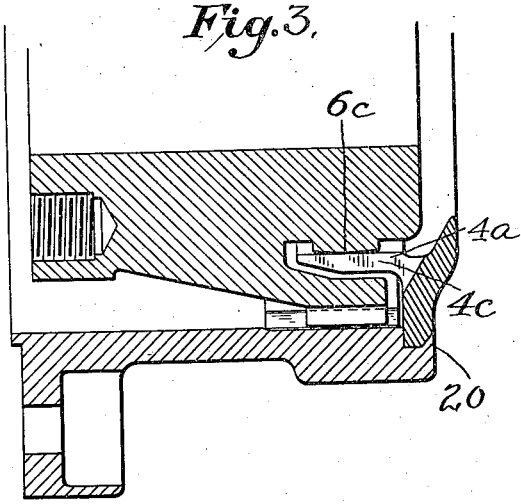
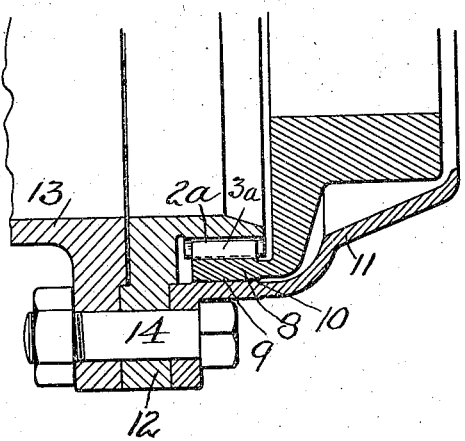
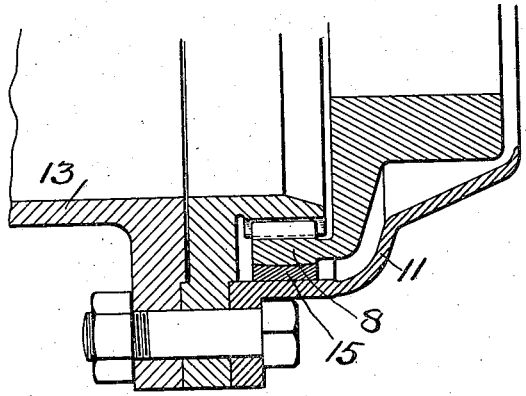
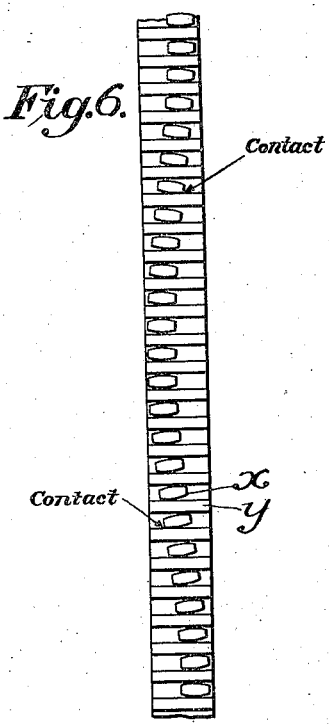

Patented Sept. 6, 1927.

1,641,669

UNITED STATES PATENT OFFICE.

GUSTAVE FAST, OF ANNAPOLIS, MARYLAND, ASSIGNOR TO THE BARTLETT HAYWARD COMPANY, OF BALTIMORE, MARYLAND, A CORPORATION OF MARYLAND.

FLEXIBLE SHAFT COUPLING.

Application filed March 17, 1925. Serial No. 16,190.

The invention is an improvement upon that type of flexible shaft coupling disclosed by me in Letters Patent of the United States Reissue No. 15,177 dated August 16, 1921, and concerns the rocking bearing between the sleeve and the shaft ends, and other features as will be described hereinafter and particularly pointed out in the claims.

In the accompanying drawings

Fig. 3 is a similar view of a portion of a coupling with a modified form of bearing.

Figs. 4 and 5 show other forms of bearings.

Fig. 6 is a developed view of one set of the intermeshing teeth of the coupling.

Figure 1:
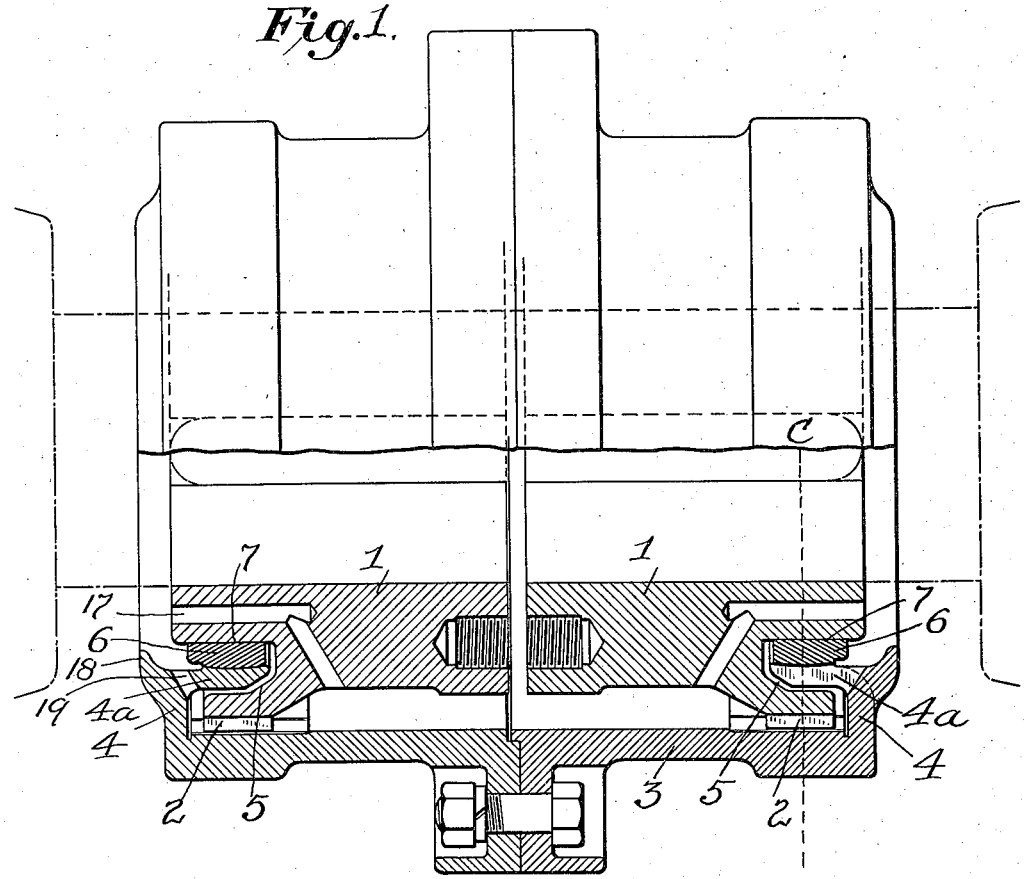
Figure 1 is a part side elevation and a part longitudinal sectional view of a shaft coupling embodying the invention.

Referring to Fig. 1 the coupling includes the shaft hubs 1, 1 to be keyed to the shaft ends, and the sleeve 3 with intermeshing rows of teeth at 2.

The sleeve has end rings, flanges or plates 4 with flanges $4^a$ projecting inwardly into annular recesses 5 in the outer end faces of the shaft hubs. These flanges bear on rings 6 slidably fitted to the shaft hubs, and resting on cylindrical surfaces 7 of the said shaft hubs. The outer peripheral faces of these rings are curved to conform to a section of a sphere whose center is at the axis of the coupling at the point C which is in a plane extending transversely to and intermediate the length of the intermeshing teeth 2. Upon this spherical surface of the ring the inner peripheral face of the flange $4^a$ bears and rocks, when the shafts are misaligned. The inner peripheral bearing face of the flange $4^a$ in this form is shaped to conform to the spherical face of the ring 6.

Figure 2:
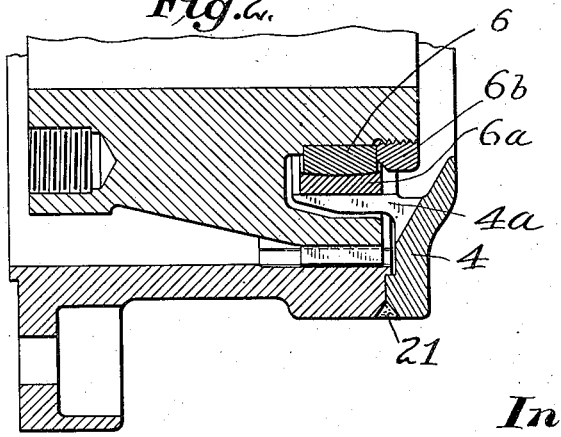
Fig. 2 is a similar view of one half of a coupling showing a spherical bearing of another form.

Instead of making the flange $4^a$ with the spherical inner face, this face may be made cylindrical as in Fig. 2 and a ring $6^a$ may be employed having an outer cylindrical peripheral face and a concave inner peripheral face curved to conform to the sphere above mentioned and bearing on the outer similarly shaped face of the ring 6. In this form the ring 6 is held in place by a collar $6^b$ which is screw threaded onto the shaft hub. Instead of employing a separate ring having the spherical bearing face, a spherical bearing may be employed integral with the shaft hub as in Fig. 3 at $6^c$.

In all the forms above described the spherical bearing is within the circle in which the intermeshing teeth 2 lie and in all said forms the flange $4^a$ may be split at intervals as shown at $4^c$ in Fig. 3 the purpose of which is to make this flange resilient to the small degree desirable in order to compensate for variations in the diameter of the spherical bearing whether this be of one form or the other of those described above.

It will be understood that the shaft hubs are mounted with a press fit upon the shaft ends and the degree of this press fit varies according to different standards established by different users, thus rendering it impossible, in quantity production, to adopt a standard that will exactly meet all conditions because different degrees of press fit result in slight variations in the diameters of the shaft hubs and their spherical bearing parts or members, and it is to accommodate these slight variations from the prescribed diameter of the bearing that the flange $4^a$ is made slightly yielding. This split ring or flange is made of such diameter that it can be forced into its proper relation to the hub bearing with slight pressure. Without this split flange the fitting of the bearing between the sleeve of the coupling and the shaft hub would be more difficult to perform in view of the high degree of accuracy necessary, and the different diameters which would be encountered. If the clearance at the bearing is too great the sleeve will vibrate and be noisy and on the other hand, if it is too tight, the lateral flexibility of the coupling or its capacity to permit slight endwise relative movement of the shaft ends will be impaired. The split flange will obviate these objections.

Instead of having the spherical bearing within the circle of teeth it may be located outside thereof as in Figs. 4 and 5. In the form shown in Fig. 4 the teeth $2^a$ of the shaft hubs are located on the interior of the flanges 8 thereof while the teeth on the sleeve are located on the outer side thereof to mesh with the teeth $2^a$.

The spherical bearing surface is formed on the outer peripheral face of the flange 8 at 9 and the bearing surface on the sleeve is provided at 10 on the end section 11 of the sleeve casing. This surface is cylindrical. The sleeve end section 11 or flange is bolted to the section 12 of the sleeve and the two sections 12 are connected together by a central section 13. Bolts 14 serve to fasten the sections together.

Fig. 5 is similar to Fig. 4 excepting that a ring 15 having its inner peripheral face spherical and its outer peripheral face cylindrical is interposed between the spherical bearing face of the hub flange 8 and the end section 11 of the sleeve.

In all cases above described there is provided a spherical bearing, the center of which is at the axis of the coupling and in a plane transverse to and intermediate the length of the intermeshing teeth so that the sleeve and shaft hub will not assume an eccentric relation when the shafts are misaligned, as would be the case if the center about which the sleeve and shaft hub rock relative to each other were located to one side of the plane mentioned.

These various forms of spherical bearings which employ a ring having the spherical surface formed thereon provides a definite and substantial surface of contact according to the width and diameter of the ring extending continuously around the axis of the coupling.

As shown on the diagram Fig. 6 one row of teeth may be formed with their side or bearing faces convexly curved from end to end, and these may mesh with straight teeth of the companion row or the latter row may be curved also. The object of this form of tooth is to bring more teeth into intimate relation for imparting the drive from one to the other when the shafts are considerably misaligned and the shock loads are excessive, such for instance, as in rolling mill service. Teeth at 180° apart are in engagement, at the points marked "Contact", with the adjacent teeth which are represented as being straight teeth. It will be noted that while the next tooth marked x is not in actual contact with its adjacent tooth y there is only a minute space separating them and this close proximity of these teeth is not merely at one point but exists for a considerable length of the opposing faces of the teeth x and y so that under heavy load these teeth will come into driving contact for a material part of their length, and this will be true of other teeth along the row, due to the convex shape of the sides of teeth x.

The theoretically correct shape of tooth or load carrying surface which would maintain contact on each and every tooth when considerably misaligned would be a spherical tooth. With such a tooth, however, on account of its great curvature the area of contact would be very small amounting only to a mere spot on each tooth, which under heavy work would break down.

With all straight teeth or teeth having any other curve than a spherical there is theoretically only contact at two teeth 180° apart.

However, the surfaces of straight or nearly straight teeth are in much closer proximity for a greater distance from the point of contact or the point of near contact than would be the case with spherical teeth and the oil film between the teeth, having a definite thickness tends to distribute the pressure over a greater surface.

With a slightly curved tooth, the curve of which must be a compromise between a straight and spherical or circular tooth. it is possible to bring a greater number of teeth into closer proximity without sacrificing too much contact surface along the tooth.

The object is to lower the stress in the individual teeth during a shock load period which may be many times that of the normal load and at the same time have ample pressure distribution by the oil film which prevents wear.

As intimated above, with the teeth of the convexly curved side or bearing faces the oil film between the teeth plays an important part in assisting in transmitting the power from tooth to tooth and through a greater area of the opposed faces of the teeth than would be the case with either spherical teeth or straight teeth.

The lubricant is supplied to the sleeve through a filling port 17, Fig. 1, and the amount of lubricant which the sleeve contains should be sufficient to submerge the teeth and also the spherical bearing surfaces when the coupling is at rest. The lubricant will be caused to pass between the teeth by centrifugal force. The sleeve is provided with lips or flanges 18 and oil ports 19, the said flanges are so located that the lubricant will be maintained at the proper depth within the sleeve.

It is important in a shaft coupling of the type described above, in which reliance is had upon an oil film between the teeth to carry the load, without metallic contact, that the oil be retained in the sleeve or casing. When the coupling is in service under load it floats or moves axially due to shocks from the coupled shafts. These shocks will be imparted to or taken by the end plates or flanges of the sleeve, with the result, if these end plates are held by screws, that these fastenings will crystallize and break, thus causing a leak at these points. I, therefore, provide such a construction of the sleeve with its end plates or flanges that no leak can occur at the points where the main body of the sleeve is joined to the end plates.

In order to insure against leakage of oil I hermetically seal the end plates or rings to the coupling sleeve. This may be done by welding the end plate or supporting ring 4 at 21 to the main body of the sleeve as in Fig. 2 or by means of spinning a flanged joint between these two members as at 20, Fig. 3, or by first forming the joint by spinning and then welding it.

In coupling the two shafts it is sometimes found necessary to meet a condition where a fine angular adjustment of one shaft in relation to the other is necessary, such for instance as in coupling the shafts of two alternators and at the same time synchronizing them as to phase. For this purpose I provide a different number of teeth in the set at one end of the coupling from the number in the set at the other end of the coupling, say that one set has 60 teeth and the set at the opposite end of the coupling has 61 teeth. This will provide for a fine angular adjustment of one shaft in relation to the other, say approximately equal to 0.1° because:

$1/60 \times 1/61 = 1/3660$ of one revolution, or $360°/3660 = 0.1°$ approximately It will be noted that features shown in one figure of the drawing may be embodied in the other figures such for instance as the different numbers of teeth, the split flange and the hermetic sealing of the ends of the sleeve so that in all cases where the feature may be transposed from figure to figure, the description is to be regarded as applying as through shown in a single form of the invention.

The sleeve is formed of transverse sections and by reason of this construction one result is that the separate bearing ring can be assembled in relation to the sleeve. In Fig. 1 the sectional feature consists of the two members like 3 bolted together. The rings 6 are assembled within the sections before they are bolted together. This permits the use of the flange 18 of sufficient height to hold oil up to the proper line.

In Fig. 5 the sectional feature is carried out for assembly by making the flange or end portion 11 of the sleeve separate from the rest thereof.

In Fig. 4 also the sectional feature of the sleeve comprises the separate end section 11.

I claim:

1. A flexible shaft coupling comprising a sleeve having at its end a row of teeth, a shaft hub having a row of teeth meshing with the teeth on the sleeve and an annular bearing between the sleeve and shaft hub comprising an annular flange on one part, the bearing surface of which conforms to the section of a sphere whose center is at the axis of the coupling in a plane transverse to and intermediate the length of the intermeshing teeth, and a surface on the other part of like spherical formation with which the spherical surface of the flange contacts, said flange being split transversely, substantially as described.

2. A flexible coupling for shafts comprising a sleeve having at its end a row of teeth, a shaft hub having a row of teeth meshing with the teeth on the sleeve and an annular bearing between the sleeve and shaft hub comprising an annular flange on one part, having a bearing surface on the other part, said annular flange being split at intervals rendering it flexible to accommodate itself to variations of the bearing from a prescribed diameter, substantially as described.

3. A flexible coupling for shafts comprising a sleeve having at its end a row of teeth, a shaft hub having a row of teeth meshing with the teeth on the sleeve and an annular bearing between the sleeve and shaft hub comprising an annular flange projecting inwardly from the end wall of the sleeve into an annual recess in the shaft hub, and engaging said hub, said flange being split at intervals to provide resilience in said flange, substantially as described.

4. A flexible shaft coupling comprising a member having a row of teeth to engage a row of teeth on another member, and having rocking movement relative thereto under misalignment of the shafts, the teeth of the first mentioned row having their side faces which contact with the side faces of the teeth of the other member curved convexly lengthwise thereof, the teeth of said other member being elongated in respect to said first mentioned teeth, substantially as described.

5. A flexible shaft coupling comprising a member having a row of teeth the side faces of which are curved convexly lengthwise of the coupling, and a member having a row of teeth with straight sides extending lengthwise of the coupling, said straight sided teeth being elongated in respect to the teeth first mentioned, and meshing therewith whereby bearing contact between the teeth is maintained under misalignment of the shafts, substantially as described.

6. A flexible shaft coupling comprising a sleeve having a row of teeth at each end, shaft hubs having teeth engaging the teeth of the sleeve, said sleeve having an end wall, the body of the sleeve being spun into connection with said end wall to prevent escape of oil, substantially as described.

In testimony whereof I affix my signature.

GUSTAVE FAST.